Figure 1:
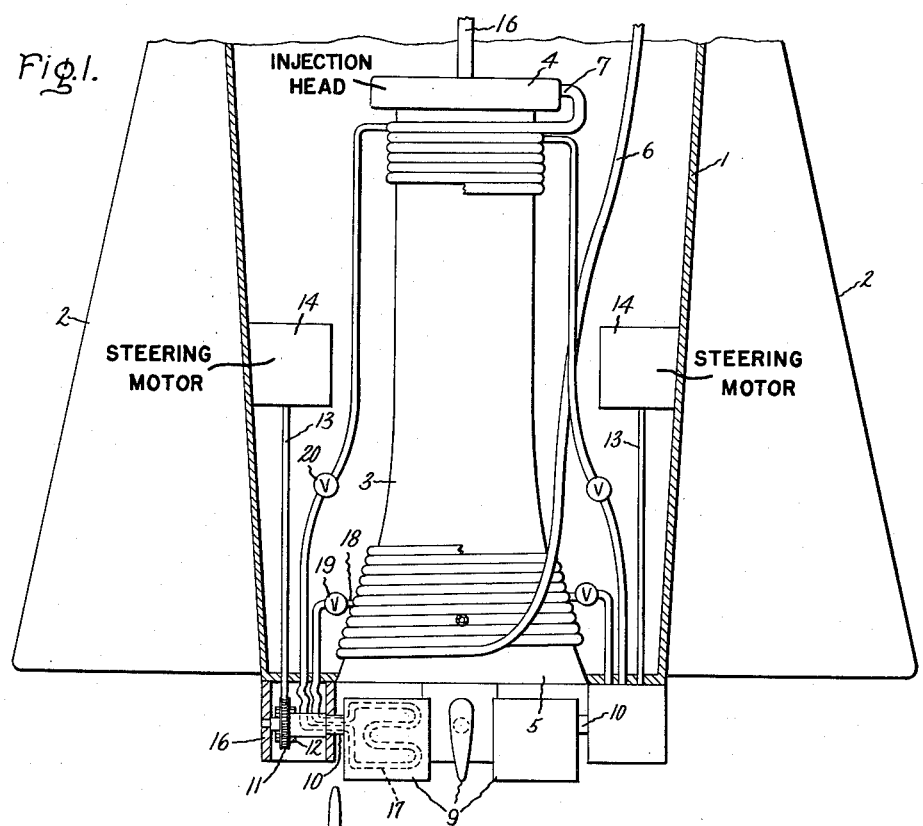

Oct. 26, 1954 — E. H. HULL — 2,692,475
ROCKET STEERING MEANS
Filed Oct. 11, 1950

Inventor:
Edwin H. Hull,
by Paul A. Frank
His Attorney.

Patented Oct. 26, 1954

2,692,475

UNITED STATES PATENT OFFICE 2,692,475

ROCKET STEERING MEANS

Edwin H. Hull, Scotia, N. Y., assignor, by mesne assignments, to the United States of America as represented by the Secretary of the Army Application October 11, 1950, Serial No. 189,620

5 Claims. (Cl. 60—35.54)

This invention relates to rockets. More particularly, it relates to auxiliary jet vanes which are used to guide a ground-launched rocket during the early stage of its flight.

Rockets may be launched from the ground by any of several methods. In one instance guide means, such as rails or a tube, are utilized to stabilize the motion of the rocket until a velocity is attained at which the regular aerodynamic control surfaces are capable of controlling its further free flight. In another instance the rocket is launched from the ground without the use of guide means such as rails, tubes, and the like. Here special means must be employed to insure stable flight until a suitably high velocity is reached for the regular control surfaces to fix the trajectory. Customarily, small vanes, steered by motors, are mounted in the rocket motor exhaust gas stream are used to control the initial flight which may typically take place under an acceleration equal to one-half that of gravity.

Heretofore, such jet vanes have usually been made of graphite, wood, or other carbonaceous materials shaped into a crude imitation of a very thick airfoil. The initial shape of vanes made of such material is of little consequence since burning and erosion of the leading edge by the hot issuing gases rapidly changes the vane profile and aerodynamic shape. The change in the shape and size of the vanes is often so rapid and pronounced, and shifts the center of pressure of the vane to such an extent that the vane steering motors have a tendency to stall or fail to properly manipulate the vane. Additionally, uneven erosion of one vane with respect to another often causes serious unbalance of the rocket which in some cases is not correctable. In such event, the rocket may fly out of control, and not only be lost, but cause damage to surrounding installations.

The lift-drag ratio of the usual auxiliary jet vanes is also very poor. The initial high drag of vanes commonly used heretofore and the increased drag as they become misshapen during use detracts seriously from the resultant thrust of the rocket motor.

It is an object of this invention to provide improved auxiliary launching vanes for ground-launched rockets.

It is another object of the invention to provide such vanes for ground-launched rockets which maintain their original shape throughout the launching period and until the regular aerodynamic control surfaces of the rocket are operable to control its flight.

A further object of the invention is to provide auxiliary launching vanes for ground-launched rockets which will not burn or erode in use.

A still further object of the present invention is to provide such vanes for ground-launched rockets which are readily disposed of after the rocket attains flight speed and other control surfaces are in effective operation.

Figure 2:
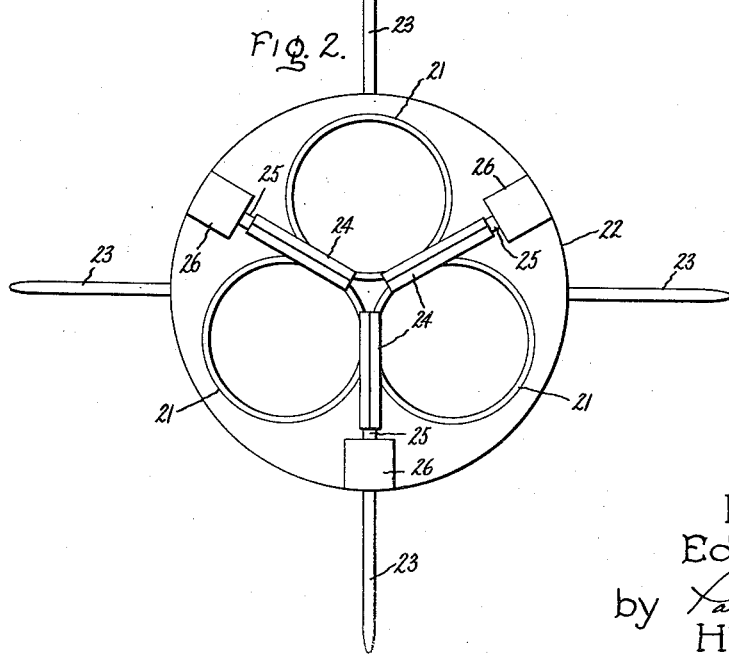

Other objects will become apparent and the invention better understood from a consideration of the following description and the drawing in which Fig. 1 shows a typical embodiment using the vanes of the present invention, and Fig. 2 shows an arrangement of the present vanes when using clustered rocket motors.

It has been found that improved auxiliary rocket launching vanes which maintain their shape during their useful period of operation may be readily provided.

More particularly, it has been found that improved auxiliary rocket launching vanes which retain their shape throughout their useful life may be provided by fabricating the vanes of thin metal and circulating a coolant through them.

According to the present invention auxiliary jet vanes, made in the desired airfoil or aerodynamic shape, retain their form until they are deliberately burned up or removed after the launched rocket has attained such velocity that the regular control surfaces, rudders, vanes, or the like, may assume their role of effectively steering the missile.

The present vanes are controlled in the usual manner by a steering motor linked to the vane trunnions through shafting and gearing. The coolant fluid may be furnished from a separate supply. However, it is most convenient to bleed off a portion of one of the rocket propellants or reactants and lead it by means of tubing through the vane trunnion and along the leading edge of the vane which is most exposed to the hot gases exiting from the motor nozzle. The reactant which serves as coolant is thus able to extract heat from that part of the vane requiring the most protection before it is led through other exposed portions of the vane, such as the rest of its periphery, back through the trunnion and into the regular reactant line. If desired, instead of merely conducting the coolant around the periphery of the vane, it may be made to circulate through the entire vane or any part of the vane by making the entire interior a conduit for the coolant with inlet and outlet means or by coiling or otherwise arranging the conduit within the vane to provide the desired cooling surface.

The coolant line for the vanes may be connected to the main reactant line at any desired point. It may, for example, be conveniently connected to the reactant line at the point where the latter enters the motor injection head. In another case, where one of the reactants is used for regenerative cooling of the rocket motor before injection by first leading it through a cooling jacket mounted around the motor, the vane inlet line may be connected to a part of the jacket closest to the vane. Other arrangements will occur to those skilled in the art.

When the rocket has attained such a velocity that the regular control surfaces are capable of any further steering, the coolant inlet and outlet lines to the vanes may be shut off. Since the thin metal auxiliary vanes are now no longer being cooled, they very quickly and uniformly melt down or burn, thus disposing of themselves. If desired, a gas purge may be provided using an inert gas such as nitrogen to remove all cooling fluid from the open portions of the coolant lines.

At least a portion of and, alternatively, all parts of the present cooled vanes may be mounted directly in the path of the hot exhaust gases, though the trunnion portions should preferably be mounted outside of the jet proper. In certain cases as where clusters of rocket motors are used, the auxiliary vanes may be mounted between the motor nozzles so that they are less subject to burning and erosion by the gases, but are still able to provide adequate control for the initial flight of the vehicle.

Reference is now made to the drawing for specific examples of the application of the present invention. In Fig. 1 there is shown a number of the present vanes mounted downstream of the nozzle of a single motor rocket. Mounted within the rocket 1 having regular aerodynamic control surfaces 2 is a motor 3 of the usual type with a reactant injection head 4 and nozzle 5. One of the reactants or propellants is introduced to the injection head through conduit 16. The other reactant in the embodiment shown is first led from its reservoir, not shown, through conduit 6 which is coiled around motor 3 in a helically or spirally disposed fashion to provide for regenerative cooling of the motor. The coolant-reactant then enters the injection head at 7. Alternatively, the motor may be operated without cooling or with a special non-reactant coolant in which case the other reactant may be led directly from its reservoir to the injection head. Both reactants may also be used for cooling if desired.

The auxiliary jet vanes of the present invention are shown at 9 as being of an airfoil shape, typical of such vanes, supported on hollow trunnions 10 which are welded or otherwise fixed to the vane. Preferably, the vane 9 is constructed of thin metal though other materials may be used so long as they possess suitable heat transfer characteristics. In order to provide for rotation of trunnion 10, and through it vane 9, the trunnion is provided with gear 11 which engages with worm gear 12 mounted on shaft 13 which is driven by steering motor 14. Shaft 13 is supported in hollow member 16 which also serves to enclose the gears and support trunnion 10. Other means of controlling the vanes will occur to those skilled in the art.

Cooling of the vane 9 is provided for by means of conduit or tubing 17 mounted within the vane, as shown in Fig. 1 or in any other desired configuration. The entire interior of vane 9 may also be filled with coolant with suitable entry and exit conduits being provided. The inlet end of conduit 17 passes through trunnion 10, as through a flexible joint, which allows for free turning of the trunnion to the coolant conduit at point 18. As pointed out above, a separate coolant other than one of the reactants may be used, the use of a reactant for cooling purposes being shown here for purposes of simplicity only. Likewise, the coolant for the vanes may be tapped at any point in the coolant line, as it leaves its reservoir, at the injection head, or any point between. A valve 19, which may be controlled remotely, is located in conduit 18. The outlet end of conduit 17 is led back into the coolant line at any convenient point between the inlet portion and the injection head 7 and is also fitted with a valve 20 similar to 19.

In operation, with the reactants flowing through the injection head and burning in the motor 3, the hot exhaust gases issuing from nozzle 5 propel the vehicle upward at an initial velocity so low that the regular control surfaces 2 are not capable of effectively guiding the flight. However, the velocity of the exhaust gases in and of themselves is sufficiently high to permit steering of the vehicle by means of vanes placed partly or wholly with the jet stream. As pointed out above, it is important that such vanes be durable throughout their short life and not change their shape due to erosion and burning away by the hot gases. Whereas all materials used heretofore, such as wood and graphite materials, disintegrate rapidly and make accurate steering of the vehicle very difficult, the use of cooled metal vanes as herein described provides a means of positively controlling the rocket during early flight. Coolant-reactant, flowing from the reactant conduit and throughout the vanes in any desired configuration or path, readily absorbs enough heat from the thin metal vane walls to keep them from melting or changing in shape. Preferably, the coolant is first introduced to the upstream part of the vane where the heat is most intense. The vanes thus cooled are readily and easily moved or adjusted by means of the steering motors through the shaft and control train provided. Inasmuch as the center of pressure on the vanes and their shape never changes, the steering motors and the steering mechanism need not be so powerful as heretofore, with a resultant saving in weight which is a critical factor in rocketry.

When the rocket reaches an air speed at which the regular control surfaces 2 can take over the steering, the now no longer useful jet vanes may be disposed of by simply closing valves 19 and 20 to block the flow of coolant. The now uncooled thin-walled vanes rapidly and uniformly melt and burn away leaving the full nozzle area of the rocket exposed. If desired, the residual coolant in the coolant conduit not melted away may be purged with an inert gas, such as nitrogen, at the same time that valves 19 and 20 are closed.

The auxiliary jet vanes of the present invention are adaptable to plural arrangements of rocket motors as well as single motors. For example, there is shown in Fig. 2 an end view of arrangement of three rocket motors 21 nested together in a triangular configuration in a rocket having an outer shell 22 and regular control surfaces 23. Jet vanes 24 mounted on trunnions 25 and posts 26 are, in such an installation, conveniently mounted between the junctures of the nozzles of the rocket motors where, in their zero control position, the gas temperature and velocity will be lowest, but yet sufficient to provide control of the rocket by means of the vanes. The steering mechanism for clustered rocket motor jet vanes is similar to that shown in more detail in Fig. 1. The present jet vane system is further adaptable to rockets having any number of motors, such as six motors, arranged in hexagonal fashion.

By the present invention there is provided a simple and improved means of guiding ground-launched rockets during the early stage of their flight and before the regular control surfaces are operable to guide the missile. The thin metal walled and fluid-cooled jet vanes made in any desired shape are unchanging in shape and provide a higher and steadier lift-drag ratio than prior jet vanes. The result is an increase in the net thrust of the rocket. The present vanes being unchanging in shape while cooled and in use have a constant center of pressure which permits the use of smaller and lighter steering mechanisms and motors than heretofore. Furthermore, when the rocket has attained a velocity at which the regular control surfaces are used, the present vanes are readily jettisonable by merely cutting off the coolant supply and allowing them to melt or burn away uniformly in a very short time in the hot exhaust gas stream without disturbing the rocket trajectory.

While the present invention has been described particularly with respect to certain specific embodiments, it is to be understood that it is intended to cover all these modifications which would occur to those skilled in the art and which do not depart from the spirit and scope of this disclosure.

What I claim as new and desire to secure by Letters Patent of the United States is:

1. A rocket provided with auxiliary automatically actuated steering vanes to control and stabilize the rocket during the initial stages of flight, said vanes being mounted outside the combustion nozzle and extending into the blast zone, said vanes being formed of a thin consumable heat conductive material, each vane being provided with an entry conduit and an exit conduit, and being further provided with a means for circulating a coolant fluid within the body of said vane, a source of coolant fluid connected with said entry conduit, valve means positioned in one of said conduits, said valve controlling the circulation of said fluid through said conduits and within the body of said vanes, said valve means being operative to close off the circulation of said coolant fluid when the rocket has attained a predetermined velocity thereby permitting said vanes to be consumed.

2. A rocket according to claim 1 wherein said vanes are formed of thin metal.

3. A rocket according to claim 1 wherein each vane is provided with an internal conduit connected with said inlet conduit and with said outlet conduit.

4. A rocket according to claim 1 wherein the coolant fluid is a rocket propellant composition.

5. A rocket according to claim 1 wherein said vanes are mounted on an axis permitting rotation of said vanes, and wherein said vanes are automatically adjusted through connection of said axis through a gear mechanism to an actuating motor.

References Cited in the file of this patent

UNITED STATES PATENTS

| Number | Name | Date |
| --- | --- | --- |
| 2,395,809 | Goddard | Mar. 5, 1946 |
| 2,486,019 | Goddard | Oct. 25, 1949 |
| 2,507,970 | Goddard | May 16, 1950 |
| 2,515,643 | Goddard | July 18, 1950 |

OTHER REFERENCES

"Life" Magazine, page 46, December 25, 1944.

"Rocketry," by C. P. Lent, pages 80, 81. Copyrighted 1947.

"Popular Science" Magazine, pages 74, 75, March 1947.